United States Patent Office 3,011,833
Patented Dec. 5, 1961

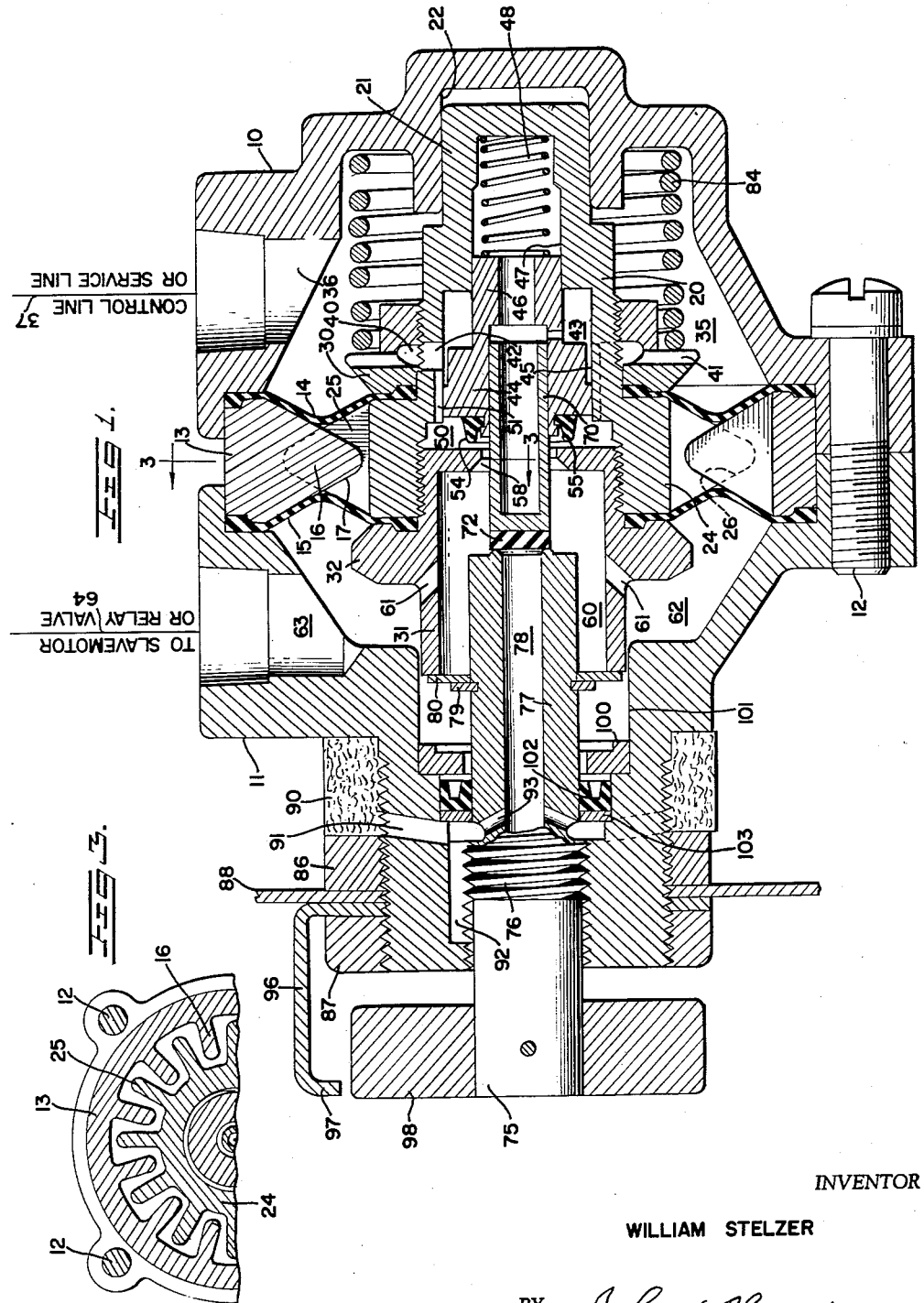

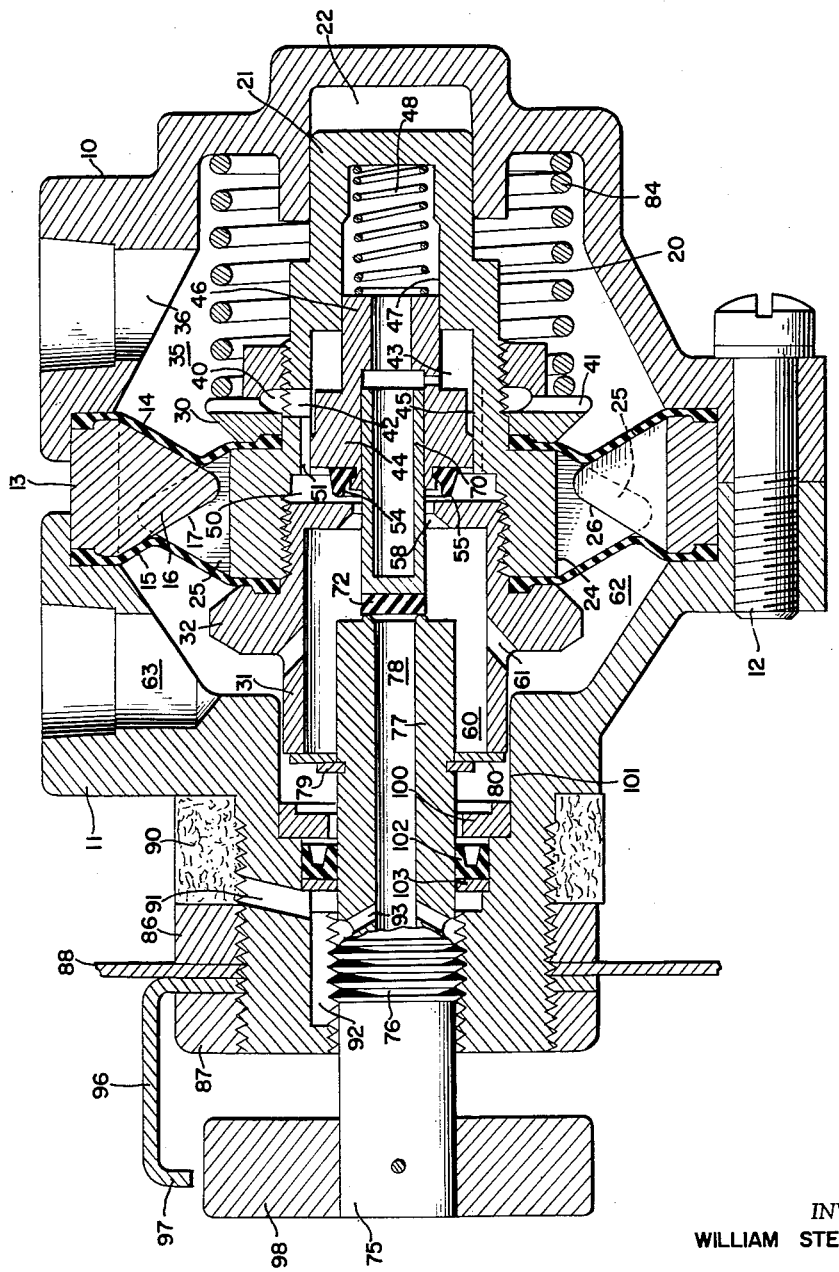

3,011,833
PRESSURE CONTROLLING VALVE MECHANISM FOR MOTOR VEHICLE BRAKE SYSTEMS
William Stelzer, Bloomfield Hills, Mich., assignor to Kelsey-Hayes Company, Detroit, Mich., a corporation of Delaware
Filed Sept. 25, 1959, Ser. No. 842,393
18 Claims. (Cl. 303—60)

This invention relates to a pressure controlling valve mechanism for motor vehicle brake systems and has particular reference to such a mechanism capable of use on vehicles of various types including tractor-trailer brake systems for adjusting application of certain of the brakes in accordance with load conditions. The construction, in a sense, is an improvement over the structure shown in my copending application Serial No. 802,834, filed March 30, 1959.

In my copending application referred to, I have disclosed a valve mechanism adapted for use, for example, in a truck wherein a booster motor is employed for applying the front truck brakes and a slave motor applies the rear brakes. A connecting line between the booster or master motor and the slave motor supplies fluid pressure to the slave motor whenever the master motor is energized, and the valve mechanism forming the principal subject matter of the copending application is adjustable to control the energization of the actuators for the rear truck wheels in accordance with the loading of the truck. In such prior construction, opposed pressure responsive elements, shown in the form of diaphragms, have their effectiveness as pressure responsive elements adjustable by lever means forming a force transmitting connection therebetween, there being means for changing the lever lengths so that pressure admitted to the inlet port of the valve may be fed through without change to the outlet or may be caused to be reduced in pressure when the vehicle is traveling relatively lightly loaded.

An important object of the present invention is to provide a valve mechanism of the general type referred to above which is applicable to the same type of system disclosed in my copending application, or which may be used in the service line of a tractor-trailer brake combination to supply to the relay valve of the trailer pressure equal to the pressure supplied to the truck brake actuators, or to supply reduced pressure to the relay valve if the trailer is traveling with less than the full load, the structure being simplified and rendered highly sensitive and being capable of easy adjustment to control the output pressure in proportion to the input pressure.

A further object is to provide a valve mechanism of the type referred to which comprises two opposed pressure responsive members subject respectively to valve inlet and outlet pressures, and to provide novel means for varying the effective areas of the pressure responsive elements to permit the adjustment of outlet pressures in proportion to inlet pressures.

A further object is to provide such a mechanism wherein the pressure responsive elements acting in opposition to each other are in the form of diaphragms connected to apply opposing forces to a pressure controlling valve device and to provide novel manually adjustable means for varying the effective areas of the diaphragms depending on whether the vehicle is fully loaded or less than fully loaded.

A further object is to provide such a valve mechanism which is normally open for the free flow of pressure therethrough when the brakes are initially applied to reduce any lagging of the application of the brakes controlled by the mechanism, and to provide novel means of the character referred to for limiting the building-up of brake applying pressures in the valve outlet in proportion to pressures supplied to the inlet, in accordance with the adjustment of the device.

A further object is to provide a mechanism of this character which readily exhausts air from the outlet chamber when pressure is reduced in the inlet chamber by the full or partial releasing of the brake pedal.

A further object is to provide a mechanism of this character a novel type of valve arrangement which functions when the brakes are released to assist, if necessary, in a complete exhaustion of pressure from the outlet chamber of the valve mechanism.

Other objects and advantages of the invention will become apparent during the course of the following description.

In the drawings I have shown one embodiment of the invention. In this showing:

FIGURE 1 is an axial sectional view through the valve mechanism showing it attached to the instrument panel, the parts being shown in normal position for a full application of the brakes controlled by the device;

FIGURE 2 is a similar view showing the device adjusted to reduce brake applying pressures when the vehicle is lightly loaded; and FIGURE 3 is a fragmentary sectional view on line 3—3 of FIGURE 1.

Referring to FIGURES 1 and 2, the numerals 10 and 11 designate a pair of body members secured together as at 12 against opposite sides of an annular divider 13. This divider serves to clamp in place between the body sections spaced opposed pressure responsive elements shown in the present instance as diaphragms 14 and 15. The divider 13 is provided with circumferentially spaced radially inwardly projecting fingers 16 (FIGURE 3) which taper to decrease in width radially inwardly as at 17 (FIGURES 1 and 2).

An axially movable body 20 is mounted in the device and has one end forming a pilot projection 21 slidable in a bore 22 formed in the body member 10. At the end opposite the projection 21, the body 20 is provided with an annular flange 24 having radially outwardly extending circumferentially spaced fingers 25 (FIGURE 3) arranged between the fingers 16. These fingers decrease in width radially inwardly as at 26. As described below the positions of the fingers 16 and 25 will be as shown in FIGURE 1 in the normal positions of the parts, the fingers registering circumferentially of the device. This position exists when the brakes controlled by the device are to be subject to full application due to the carrying of relatively heavy loads.

A nut 30 is threaded on the body 20 and clamps the radially inner edge portion of the diaphragm 14 relative to the flange 24. A second axially movable body member 31 is threaded into the flange 24 as shown and is provided with an annular flange 32 clamping the radially inner portion of the diaphragm 15 against the flange 24.

The diaphragm 14 forms with the body 10 an inlet chamber 35 to which pressure is supplied through a port 36 from a line 37. As previously stated, the present valve mechanism may be employed on a truck or tractor-trailer brake system. When employed on a truck or other vehicle having master and slave motors as referred to, with a control line connected therebetween, the line 37 will be the control line between the master and slave motors. If the valve mechanism is employed on a tractor-trailer combination, the line 37 will be the service line connected between the truck brake control valve and the relay valve of the trailer. The line 37 constitutes the pressure inlet line for supplying pressure to the chamber 35.

The nut 30 is provided with a chamber 40 communicating with the chamber 35 through radial grooves 41. The chamber 40 communicates through ports 42 with a chamber 43 formed between the body 20 and an axially movable member 44 slidable in a bore 45 formed in the body 20. The member 44 has a pilot extension 46 slidable in a bore 47 in the body 20, and a spring 48 in such bore biases the member 44 to the left in FIGURES 1 and 2.

The body 31 forms with the body 20 a chamber 50 communicating with the chamber 43 through grooves 51 formed in the body 20. In the chamber 50 an annular resilient inlet valve 54 is carried by the member 44 and has its annular lip 55 serving to control the supplying of pressure fluid to the outlet end of the mechanism as described below.

The body 31 is provided at its inner end with a port 58 controlled by the valve 54, which is normally open as shown in the drawings. Accordingly, the port 58 normally provides for the flow of pressure fluid from the chamber 50 into a chamber 60 formed in the body 31, and the chamber 60 communicates as at 61 with an outlet chamber 62 formed by the diaphragm 15 and body 11.

With the various ports, chambers, etc. previously described, it will become apparent that normally pressure fluid is free to flow from the chamber 35 to the chamber 62 and such pressure flows through a port 63 to a line 64. This line may be the control line to the slave motor of a system of the character referred to above, or it may be an outlet line leading to the relay valve of a trailer brake controlling mechanism. The line 64 may be generally referred to as the outlet line of the valve mechanism.

In the chamber 60 is arranged a valve stem 70 having a pressed fit in or formed integral with the member 44. The valve body 70 carries a resilient valve element 72, bonded to the end thereof.

An adjusting stem 75 is threaded as at 76 in the body 11 and has an axially projecting tubular portion 77 provided with an axial passage 78. The inner end of the tubular portion 77 is formed as a seat normally engaging the valve element 72. A snap ring 79 is mounted on the tubular portion 77 and engages a washer 80 which, in turn, engages the end of the body 31 when the parts are in normal position. A spring 84, in the chamber 35, engages the nut 30 and biases the nut 30 and bodies 20 and 31 to the left to tend to maintain the end of the latter in engagement with the washer 80, as shown in FIGURES 1 and 2.

Nuts 86 and 87 serve to clamp the body 11 to the vehicle instrument panel 88. The nut 86 serves to hold in position a porous member 90, similar to an air cleaner, to silence exhaust air passing outwardly through a port 91 from a chamber 92 which, in turn, communicates with the axial passage 78 through ports 93. The nut 87 also serves to anchor to the instrument panel an indicator 96 having a downturned end 97 adjacent a knob 98 carried by the outer end of the stem 95. A ring 100 has a press fit in a bore 101 formed in the body 11. Back of this ring is arranged a seal 102 seating against a washer 103 to prevent leakage around the stem 75 from the outlet chamber 62.

*Operation*

The parts normally occupy the positions shown in FIGURE 1. With the knob 98 screwed in substantially to its limit of movement shown in FIGURE 1, the outer face of such knob substantially registers with the outer face of the indicator end 97. In screwing the stem 75 into the position shown, the washer 80 will have moved the axial unit comprising members 20, 30 and 31 against the tension of the spring 84 to radially aline the fingers 16 and 25. Under such conditions, substantially the same areas of the diaphragms 14 and 15, subjected respectively to pressures in the chambers 35 and 62, will engage opposite edges of the fingers 25. The radially outer portions of the diaphragms will be seated against the fingers 16 and accordingly can transmit no force to the axially movable unit referred to, comprising members 20, 30 and 31.

The inner end of the tubular portion 77 of the adjusting stem will seat against the valve 72 and the valve element 54 will be open, the members 44 and 70 being held against the tension of the light spring 48.

Under such conditions, the inlet line 37 will communicate through port 36 with the chamber 35 which, in turn, is open through grooves 41, chamber 40, ports 42, grooves 51, chamber 50, port 58, chamber 60 and ports 61 to the outlet chamber 62. Thus the line 37 is open to the outlet line 64.

Assuming that the brake applying mechanism connected to the line 64 is associated with a heavily loaded vehicle, the parts will remain in the positions shown in FIGURE 1. Under such conditions, the admission of pressure through the line 37 to the chamber 35 will result in the supplying of the same pressure to the line 64, the areas of the diaphragms 14 and 15, effective for transmitting force through the fingers 25 of the axially movable unit being equal. Opposed pressures affecting the diaphragms, accordingly, will balance out each other, and all of the parts will remain in the positions shown in FIGURE 1 and the valve mechanism will perform no function in the application of the brakes.

Assuming that the vehicle with which the device is employed is more lightly loaded, the knob 98 will be turned to an outer position, for example, the position shown in FIGURE 2. With pressure released from the left-hand end of the body 31 (FIGURE 2), the axially movable unit will be moved to the left by the spring 84, thus following movement of the adjusting stem 75. Since the stem 75 will have moved to the left together with the axially movable unit, the spring 48 will move the member 44 and valve stem 70 to the left, the two valve elements following movement of the stem 75 so that they remain, with respect to their seats, in the same positions as in FIGURE 1. However, movement of the axially movable unit will shift the fingers 25 to the left in FIGURE 2 relative to the fingers 16. Under such conditions, an increased portion of the outer area of the diaphragm 14 will rest against the fingers 16 which take up any thrust transmitted by pressure in the chamber 35. A reduced portion of the area of the diaphragm 14 will remain in engagement with the fingers 25. Conversely, a smaller area of the diaphragm 15 will be supported by the fingers 16 and an increased area of such diaphragm will engage the fingers 25. In other words, the effective areas of the two diaphragms, that is, the areas which transmit their forces to the fingers 25, will be inversely changed and, accordingly, it will be apparent that a lower pressure in the chamber 62 is capable of overcoming a higher pressure in the chamber 35.

Assuming that control pressures are now supplied through line 37 to the chamber 35, the fluid will follow the normal open path described above to the chamber 62 and from port 63 to the line 64 to provide initially a rapid increase in pressure in the latter line for the initial operation of the brakes controlled by the present mechanism. Assuming that the line 64 leads to the relay valve of a trailer brake mechanism, therefore, there will be a relatively rapid initial application of the trailer brakes. When pressure in the chamber 62 reaches a predetermined point less than the pressure in the chamber 35, in accordance with the effective pressure areas of the diaphragms 14 and 15, the portion of the diaphragm 15 engaging the fingers 25 will move the axially movable unit to the right while the member 44 and valve stem 70 remain stationary. This movement of the axially movable unit will close the valve 54, thus preventing any further admission of pressure into the outlet line. Both valves 54 and 72 will now be closed and there will be an application of the brakes controlled by the present device in proportion to the forward or tractor brakes, the application of the rear brakes being reduced because of the lighter loading of the vehicle.

Any tendency for the pressure in the chamber 62 to increase above its intended pressure will result in slight movement to the right of the axially movable unit. Such movement will be transmitted through the valve element 54 to the member 44 and valve body 70 to "crack" the valve 72 and relieve pressure through the passage 78 to the atmosphere. Any tendency for the pressure in the chamber 62 to drop proportionately to pressure in the chamber 35 will cause pressure in the latter chamber, acting through the diaphragm 14, to move the axially movable unit to the left to "crack" the valve element 54 to admit more pressure into the chamber 62.

If the truck or tractor brakes are now released, pressure in the line 37 will drop to atmospheric pressure, thus relieving pressure in the chamber 35. Pressure previously built up in the chamber 62 will now act against the radially inner portion of the diaphragm 15 to move the fingers 25, and accordingly the entire axially movable unit, to the right, thus transmitting movement as before to the exhaust valve 72 to open such valve and exhaust pressure through the port 78. Due to the action of the spring 84 the valve 54 tends to close before pressure in the chambers 60 and 62 has been completely relieved. Such pressure, however, acting on the pressure surface formed between the edge of the lip 55 and the stem 70, will act against the member 44 to overcome the loading of the spring 48 to "crack" the valve 54 and thus relieve pressure in the chambers 60 and 62 into the inlet chamber 35, which is now connected to the atmosphere as stated above.

It will be apparent that the stem 75 may be adjusted to any desired position according to the loading of the truck or trailer, and suitable indicia on the outer surface of the knob 98 will be read in conjunction with the end 97 of the indicator 96, these elements being arranged in the cab of the truck or tractor.

From the foregoing, it will be apparent that the present device functions as a pressure regulating valve adjustable to provide only a desired ratio of pressures in the chambers 35 and 62 according to the loading of the vehicle, and adjustment is provided merely by turning the knob 98. Such adjustment inversely changes the effective areas of the diaphragms 14 and 15. This inverse changing of the areas referred to permits changes from minimum to maximum adjustment with little turning of the knob 78.

A further important feature of the invention lies in the fact that the chambers 35 and 62 normally communicate with each other. This is highly important, particularly in a tractor-trailer brake system. If the device functioned for a relatively light loading of the trailer to immediately reduce pressure in the chamber 62 relative to pressure in the chamber 35, there would be a slow initial application of the trailer brakes. With the present device, however, there is normal communication between the chambers 35 and 62, and the admission of pressure through the line 37 results in an immediate increase in pressure in the line 64 to secure a rapid application of the trailer brakes. It requires the building-up of pressure in the chamber 62 before the device functions to limit pressure in such chamber relative to pressure in the chamber 35.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a pressure controlling valve mechanism for vehicle brake systems, a valve body having an inlet and an outlet, a pair of pressure responsive elements in said body exposed to pressures respectively in said inlet and outlet to oppose each other, means in said body operated by said pressure responsive elements for controlling the flow of pressure fluid from said inlet to said outlet and means for varying the effective areas of said pressure responsive elements to predetermine the pressure in said outlet relative to pressure in said inlet.

2. In a pressure controlling valve mechanism for vehicle brake systems, a valve body having an inlet and an outlet, control means in said body normally establishing communication between said inlet and outlet, a pair of pressure responsive elements in said body exposed to pressures respectively in said inlet and outlet to oppose each other, said pressure responsive elements being connected to said control means to move the latter and control communication between said inlet and outlet, and means for varying the effective areas of said pressure responsive elements to determine the pressure in said outlet relative to pressure in said inlet at which said control means closes communication between said inlet and outlet.

3. In a pressure controlling valve mechanism for vehicle brake systems, a valve body having an inlet and an outlet, an inlet chamber in said body communicating with said inlet and an outlet chamber in said body communicating with said outlet, a pair of pressure responsive elements in said body oppositely exposed to pressures in said chambers, means movable to control the pressure in said outlet chamber relative to pressure in said inlet chamber and connected to said pressure responsive elements to be operated thereby, and means for varying the effective areas of said pressure responsive elements to determine the pressure in said outlet chamber relative to pressure in said inlet chamber at which said movable means operates.

4. In a pressure controlling valve mechanism for vehicle brake systems, a valve body having an inlet and an outlet, an inlet chamber in said body connected to said inlet, an outlet chamber in said body connected to said outlet, movable valve means in said body normally connecting said chambers, a pair of pressure responsive elements oppositely exposed to pressures in said chambers and connected to said valve means to move the latter to control communication between said chambers, and means for varying the effective areas of said pressure responsive elements to determine the pressure in said outlet chamber at which the associated pressure responsive element will overcome inlet chamber pressures affecting its associated pressure responsive element to operate said valve means and close communication between said chambers.

5. In a pressure controlling valve mechanism for vehicle brake systems, a valve body having an inlet and an outlet, control means in said body normally establishing communication between said inlet and outlet, a pair of pressure responsive elements in said body exposed to pressures respectively in said inlet and outlet to oppose each other, said pressure responsive elements being connected to said control means to move the latter and control communication between said inlet and outlet, means for varying the effective areas of said pressure responsive elements to determine the pressure in said outlet relative to pressure in said inlet at which said control means closes communication between said inlet and outlet, and means operative upon a drop in pressure in said inlet relative to pressure in said outlet line for exhausting said outlet to the atmosphere.

6. In a pressure controlling valve mechanism for vehicle brake systems, a valve body having an inlet and an outlet, an inlet chamber in said body connected to said inlet, an outlet chamber in said body connected to said outlet, movable valve means in said body normally connecting said chambers, a pair of pressure responsive elements oppositely exposed to pressures in said chambers and connected to said valve means to move the latter to control communication between said chambers, means for varying the effective areas of said pressure responsive elements to determine the pressure in said outlet chamber at which the associated pressure responsive element will overcome inlet chamber pressures affecting its associated pressure responsive element to operate said valve means and close communication between said chambers, and means operative upon a decrease in pressure in said inlet chamber relative to pressure in said outlet chamber for exhausting said outlet chamber to the atmosphere.

7. In a pressure controlling valve mechanism for vehicle brake systems, a valve body having an inlet chamber in said body and an outlet chamber in said body, an axially movable unit in said body, a valve seat in said unit, a valve normally disengaged from said seat to establish normal communication between said chambers, a pair of pressure responsive elements oppositely exposed to pressures in said chambers and connected to said unit, said pressure responsive elements normally having equal effective areas affecting said unit, and means for increasing the effective area of the pressure responsive element exposed to said outlet chamber relative to the pressure responsive element exposed to said inlet chamber whereby, upon the building-up of a predetermined pressure in said outlet chamber lower than the pressure in said inlet chamber, the pressure responsive element associated with said outlet chamber will move said movable unit to close said valve.

8. A system according to claim 7 provided with a normally closed exhaust valve controlling communication between said outlet chamber and the atmosphere, and means operative when pressure in said inlet chamber drops below pressure in said outlet chamber for opening said exhaust valve.

9. In a pressure controlling valve mechanism for vehicle brake systems, a body having an inlet chamber and an outlet chamber, an axially movable unit in said body, diaphragms connected between said body and said unit and having oppositely facing surfaces exposed respectively to said inlet chamber and said outlet chamber, a valve seat carried by said unit for controlling communication between said chambers, a valve unit movable in said axially movable unit and having a normally open valve element engageable with said seat, manually operable means for axially shifting said axially movable unit to vary the effective areas of said diaphragms for transmitting force to said axially movable unit whereby, when the effective area of the diaphragm exposed to said outlet chamber is greater than the effective area of the diaphragm exposed to said inlet chamber, and a predetermined pressure is built up in said outlet chamber lower than the pressure in said inlet chamber, the diaphragm exposed to said outlet chamber will move said axially movable unit to engage said seat with said valve.

10. A system according to claim 9 provided with means operable upon a drop in pressure in said inlet chamber below the pressure in said outlet chamber for exhausting said outlet chamber to the atmosphere.

11. A system according to claim 9 wherein said manually operable means comprises an adjusting rod having a passage open to the atmosphere, an exhaust valve normally closing said passage to said outlet chamber and connected to said first-named valve to move therewith whereby, when said first-named valve is closed and a drop in pressure occurs in said inlet chamber below the pressure in said outlet chamber, said first-named valve will transmit movement to said exhaust valve and open it and exhaust said outlet chamber to the atmosphere.

12. In a pressure controlling valve mechanism for vehicle brake systems, a body having an inlet chamber and an outlet chamber, a plurality of radial fingers decreasing in width toward their inner ends carried by said body, an axially movable unit having a plurality of radially outwardly projecting fingers decreasing in width toward their radially outer ends and positioned between said first-named fingers, a first diaphragm exposed to pressure in said inlet chamber and connected at its radially outer periphery to said body and at its radially inner periphery to said unit, the faces of said diaphragms opposite their said outlet chamber and connected at its radially outer periphery to said body and at its radially inner periphery to said unit, the faces of said diaphragms opposite their respective chambers engaging the edges of said fingers, said first- and second-named fingers normally being alined diametrically of said body, a valve device normally connecting said chambers, and manually operable means for shifting said unit in one direction toward said outlet chamber to increase the area of contact of said second diaphragm with said second-named fingers and to decrease the area of said first diaphragm with such fingers whereby, when pressure in said outlet chamber increases to a predetermined point below pressure in said inlet chamber, said second diaphragm will move said unit to close said valve means and disconnect said chambers.

13. A system according to claim 12 provided with means operative upon a drop in pressure in said inlet chamber below the pressure in said outlet chamber for exhausting said outlet chamber to the atmosphere.

14. A system according to claim 12 wherein said valve device comprises a normally stationary, normally open valve and a valve seat carried by said unit and normally spaced from said valve to be moved into engagement therewith upon movement of said unit incident to the establishment of said predetermined pressure in said outlet chamber.

15. A system according to claim 12 wherein said valve device comprises a normally stationary, normally open valve and a valve seat carried by said unit and normally spaced from said valve to be moved into engagement therewith upon movement of said unit incident to the establishment of said predetermined pressure in said outlet chamber, said manually operable means comprising a normally stationary adjustable member having a passage open to the atmosphere, and an exhaust valve normally closing said passage to said outlet chamber and connected to said first-named valve whereby movement of said seat to and beyond the position where it engages said first-named valve will open said exhaust valve to exhaust said outlet chamber to the atmosphere.

16. A system according to claim 12 wherein said manually operable means comprises a stem threaded axially in said body and having a stop element engaging said unit to limit its movement toward said outlet chamber, and a spring biasing said unit for movement to maintain it in engagement with said stop means.

17. In a pressure controlling valve mechanism for vehicle brake systems, a valve body, an inlet chamber in said body, an outlet chamber in said body, an axially movable unit in said body having a valve seat between said chambers, a normally open valve engageable with said seat to close communication between said chambers, a pair of diaphragms in said body having opposed faces exposed respectively to said inlet and outlet chambers and connected at their inner peripheries to said axially movable unit, and means for varying the areas of said diaphragms effective for transmitting forces to said axially movable unit whereby, when said effective area of the diaphragm exposed to said outlet chamber is greater than said effective area of the diaphragm exposed to said inlet chamber, said axially movable unit will move to engage said seat with said valve, said valve being annular and having a surface exposed through said valve seat to said outlet chamber to be subject to pressure therein whereby, upon a drop in pressure in said inlet chamber, pressure in said outlet chamber will open said valve to exhaust pressure from said outlet chamber to said inlet chamber.

18. In a pressure controlling valve mechanism for vehicle brake systems, a body having an inlet chamber and an outlet chamber, an axially movable unit in said body, means biasing said unit for axial movement in one direction, diaphragms connected between said body and said unit and having oppositely facing surfaces exposed respectively to said inlet chamber and said outlet chamber, a valve seat carried by said unit for controlling communication between said chambers, a valve unit movable in said axially movable unit and including a normally open annular valve element engageable with said seat, manually operable means adjustable axially of said body in the other direction to engage and predetermine the axial position of said axially movable unit to vary the effective areas of said diaphragms for transmitting force to said axially movable unit whereby, when the effective area of the diaphragm exposed to said outlet chamber is greater than the effective area of the diaphragm exposed to said inlet chamber, and a predetermined pressure is built up in said outlet chamber lower than the pressure in said inlet chamber, the diaphragm exposed to said outlet chamber will move said axially movable unit to engage said seat with said valve, an exhaust valve for exhausting pressure from said outlet chamber upon a pressure drop in said inlet chamber below the pressure in said outlet chamber, and a spring biasing said valves toward closed position, said valve unit having a pressure surface open to pressure in said outlet chamber to be moved against said spring to exhaust pressure from said outlet chamber to said inlet chamber upon a substantial drop in pressure in said inlet chamber.

References Cited in the file of this patent

UNITED STATES PATENTS

| | | |
|---|---|---|
| 2,033,842 | McFarland | Mar. 10, 1936 |
| 2,170,086 | McCune | Aug. 22, 1939 |
| 2,313,991 | Fitch | Mar. 16, 1943 |
| 2,370,582 | Rodway | Feb. 27, 1945 |
| 2,450,464 | Bent | Oct. 5, 1948 |
| 2,747,599 | Watson | May 29, 1956 |
| 2,950,147 | Neubeck | Aug. 23, 1960 |